United States Patent [19]

Weiler et al.

[11] Patent Number: 4,613,018

[45] Date of Patent: Sep. 23, 1986

[54] BRAKING CALIPER FOR A SPOT-TYPE DISC BRAKE

[75] Inventors: Rolf Weiler, Frankfurt - Sindlingen; Rudolf Thiel, Frankfurt am Main; Uwe Bach, Niedernhausen; Peter Panek, Steinbach, all of Fed. Rep. of Germany

[73] Assignee: ITT Industries, Inc., New York, N.Y.

[21] Appl. No.: 672,277

[22] Filed: Nov. 16, 1984

[30] Foreign Application Priority Data

Nov. 17, 1983 [DE] Fed. Rep. of Germany ....... 3341480

[51] Int. Cl.$^4$ ................. F16D 65/20; 92 170; 92 171; 188 72.4; 188 72.5; 188 368; 188 369; 188 370
[52] U.S. Cl. ........................ 188/72.4; 92/171
[58] Field of Search ............. 92/170, 171; 188/72.4, 188/72.5, 368, 369, 370

[56] References Cited

U.S. PATENT DOCUMENTS

| | | | |
|---|---|---|---|
| 3,315,573 | 4/1967 | de Castelet | 92/171 |
| 3,548,973 | 12/1970 | Laverdant | 188/72.5 |
| 4,085,661 | 4/1978 | Schreiver | 92/170 |
| 4,203,354 | 5/1980 | Cunningham | 188/72.4 X |

*Primary Examiner*—Duane A. Reger
*Attorney, Agent, or Firm*—James B. Raden; Donald J. Breh

[57] ABSTRACT

A braking caliper for a pressure medium-operated spot-type disc brake is provided. The wheel cylinder piston for forcing the brake pads are held in a bore of a braking caliper which embraces the edge of the brake disc. The outer cylindrical surface of the pot-shaped wheel cylinder comprises a flange or collar which is in abutment with a shoulder provided between the two sections of the bore formed as a stepped bore. The outer cylindrical surface of the wheel cylinder is press fit in the bore of the braking caliper.

8 Claims, 5 Drawing Figures

BRAKING CALIPER FOR A SPOT-TYPE DISC BRAKE

BACKGROUND OF THE INVENTION

The present invention relates generally to disc brakes and, more particularly, to a braking caliper for a pressure-medium-operated spot-type disc brake comprising at least one wheel cylinder held in the braking caliper, including a piston for forcing the brake pads into contact with the brake disc enclosed by the brake caliper.

One known type of spot-type disc brake is shown in U.S. Pat. No. 3,548,973. The disc brake is equipped with a separately formed wheel cylinder the housing of which, on two oppositely arranged sides, comprises strip-type projections disposed in parallel with respect to one another by way of which the wheel cylinder is held in corresponding grooves cut into the braking caliper. A spring-loaded bolt or locking bar is provided for preventing the wheel cylinder with the two strip-type projections thereof from inadvertently slipping from the grooves of the braking caliper. Such a conventional spot-type disc brake has the disadvantage that forming the grooves in the braking caliper requires a labor and cost-intensive machining method. Further, the strip-type projections require machining of at least two respective side faces resulting in a further cost increase. The state-of-the-art braking caliper involved the risk of being overloaded in the area of the grooves causing the same to break out; however, a braking caliper specifically reinforced at the endangered points is of a relatively heavy weight and a large structural volume increasing for example, the mass on the wheel of the motor vehicle.

A another conventional spot-type disc brake in shown in U.S. Pat. No. 3,734,243. The disc brake shown in that patent has a separate pot-shaped wheel cylinder which includes a circumferential collar engaging a U-shaped recess provided in one of the cheeks of the braking caliper. Such engagement prevents the wheel cylinder from displacing toward the longitudinal axis of the wheel cylinder bore. The pot-shaped wheel cylinder is inserted into the corresponding U-shaped recess in the radial direction, i.e. crosswise of the longitudinal axis of the wheel cylinder and from the bottom into the braking caliper. The cylinder is locked with the aid of a spring-loaded locking bolt to prevent inadvertent slipping out. For this purpose, the wheel cylinder includes a radially extending ear-shaped lug which is provided with a bore engaging the locking bolt disposed in the braking caliper when the wheel cylinder has turned into its operating position. Such prior art spot-type disc brake has the disadvantage that the U-shaped recess in the caliper is difficult to manufacture. Moreover, the wheel cylinder is safely supported only on a part of the collar by a positive connection. Accordingly, the braking caliper is required to have comparatively strong walls in the area of the U-shaped recess. Finally, locking by use of a locking bolt in a bore in the braking caliper and a spring is both unreliable and costly.

Accordingly, it is an object of the present invention to provide an improved spot-type disc brake.

SUMMARY OF THE INVENTION

In the disc brake of the present invention, it is desirable that the braking caliper and wheel cylinder have a closed form of smooth surfaces and a flat outer contour. In machining the cast braking caliper and wheel cylinder, it is desirable that only drilling and turning operations are to be employed which even in large-scale production will readily result in a particularly high dimensional stability. Any gaps or depressions required are located such that spots of corrosion are prevented from occurring in the final assembly of the braking caliper.

In accordance with the invention, the pot-shaped wheel cylinder is formed as a substantially rotationally symmetrical component. The outer cylindrical surface of the cylinder comprises at least one collar which is in abutment with a shoulder provided between the two sections of the wheel cylinder bore forming a stepped bore.

Preferably, the pot-shaped wheel cylinder in the area of the cylindrical surface of the step of smaller diameter of the bore comprises a circumferential flat rib in the area of which the wheel cylinder expands in barrel-shaped form.

In another embodiment of the wheel cylinder the zone between the collar and the bottom part of the cylinder comprises a central portion of truncated cone configuration.

Preferably, the braking caliper in the area of the wheel cylinder bore and in coaxial relationship to the bore, is provided with a circumferential edge or flange or with tongue-shaped projections. Such projections are adapted to be bent off toward the outer cylindrical surface of the pot-shaped wheel cylinder and, after bending, engage an annular groove-type depression.

In a preferred embodiment of the braking caliper of the present invention the bore for the wheel cylinder, on the side facing the brake disc, is provided with an approximately arcuate recess radially open toward the brake disc center. Such recess permits the introduction of the wheel cylinder into the bore from the space between the two cheeks of the braking caliper.

DESCRIPTION OF THE PREFERRED EMBODIMENT

Figure 1:
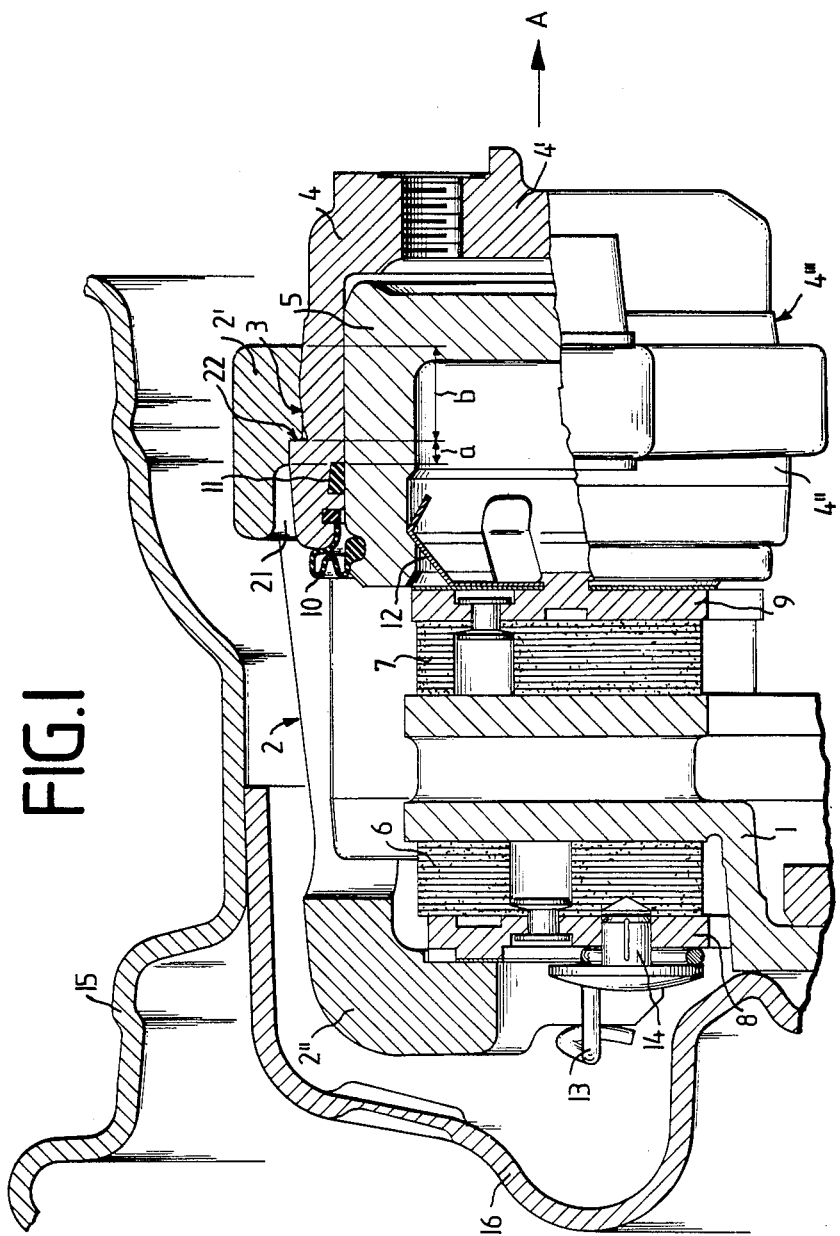
FIG. 1 is a partial longitudinally sectional view of a first embodiment of the braking caliper of a spot-type disc brake, showing a portion of the felloe and of the brake disc.
Figure 2:
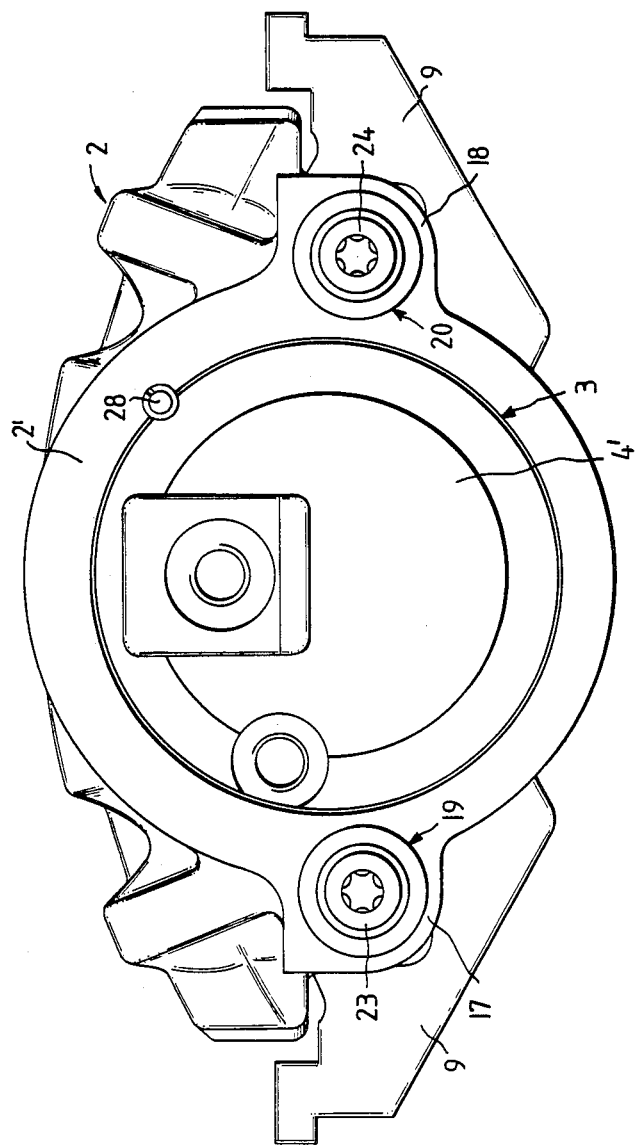
FIG. 2 is a side view of the brake caliper in floating arrangement viewed from the wheel cylinder side.
Figure 3:
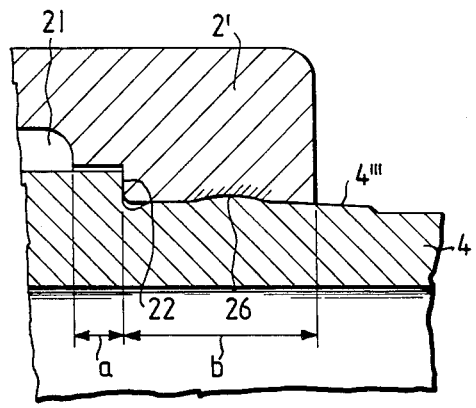
FIG. 3 is a detail of the junction between the wheel cylinder and the brake caliper in enlarged scale.

Referring now to FIGS. 1-3 of the drawings, the spot-type disc brake is comprised of a braking caliper 2 embracing brake disc 1 with a wheel cylinder 4 having a wheel cylinder piston 5 being held in cheek 2' of the braking caliper 2 in a bore 3. Brake pads 6, 7 are shown having rear plates 8,9 and are guided on either side of the brake disc 1 in braking caliper 2. Dust collar 10 with sealing ring 11 seals wheel cylinder piston 5 against wheel cylinder 4. Spread element 12 fixes brake pad 7 and rear plate 9 to the wheel cylinder piston, and rivet 14 holds spring clip 13 on rear plate 8. Felloe 15 with wheel bowl 16 partly encloses braking caliper 2. Eyes 17, 18 are disposed on cheek 2' of braking caliper 2 and extend laterally and are provided with bore 19, 20. Bolts 23, 24 are guided through bores 19, 20 and bolts 23, 24 are rigidly disposed on the brake carrier to hold and guide braking caliper 2 on the braking carrier.

The arrangement, support and fixation of wheel cylinder 4 of pot-shaped configuration in bore 3 of braking caliper 2 will now be explained. Cheek 2' is provided with an arcuate recess 21 on the inner side thereof facing brake disc 1 which, when viewed in the radial direction, is open toward the brake disc center and which permits insertion of the wheel cylinder 4 into bore 3 from the brake disc center. Bore 3 is formed as a stepped bore, with shoulder 22 formed between the large step a of bore 2 and step b of bore 2 being in abutment with collar 4" of wheel cylinder. 4 Wheel cylinder 4 central portion 4''' has a slightly conical configuration so that wheel cylinder 4, in the direction of arrow A, can radially be introduced into bore 3. The inner diameter of step b of bore 3 and the outer diameter of central portion 4''' of wheel cylinder 4 are so dimensioned that wheel cylinder 4, when introduced into bore 3, will have to be forced thereinto by applying a high amount of force in order to attain the final seat thereof (in which collar 4" will be in abutment with shoulder 22). As the braking caliper is made of a material (e.g. spheroidal-graphite cast iron) of a predetermined elasticity, cheek 2' will be able to expand to such an extent that wheel cylinder 4 after having been forced into bore 3 is rigidly connected to braking caliper 2.

Figure 4:
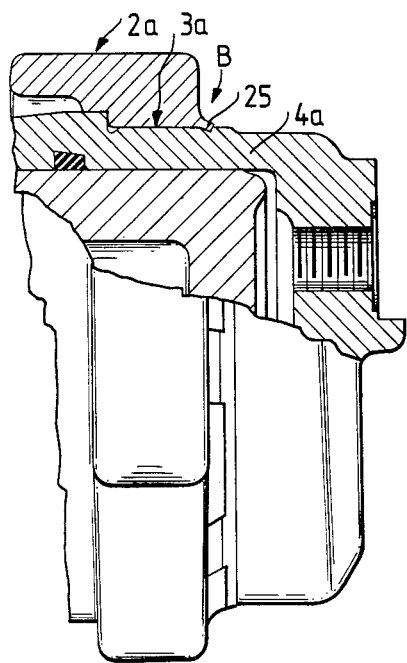
FIG. 4 is a partial longitudinal section of an alternative embodiment of the braking caliper of the present invention and FIG. 5 is a detail of the junction between the wheel cylinder and the braking caliper of the alternative embodiment in enlarged scale.
Figure 5:
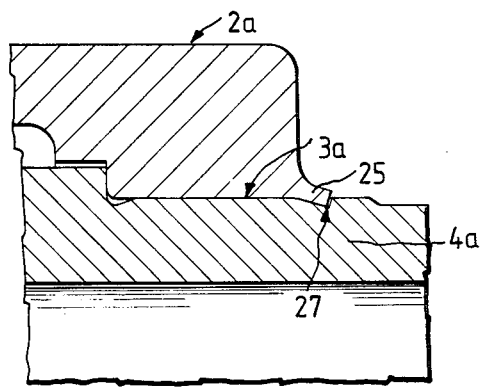

In the event that the elasticity of the material of which the braking caliper 2 is made will not be sufficient for the afore-described forcing or urging of wheel cylinder 4 so that an absolutely rigid seat of wheel cylinder 3 can not be attained in this manner, braking caliper 2a may, as shown by FIGS. 4 and 5 in the area of bore 3, be provided with a circumferential narrow flange 25. After introduction of wheel cylinder 4a into bore 3a flange 25 will be bent off into the direction of arrow B, thereby firmly anchoring the edge of flange 25 in an indentation 27 in the outer cylindrical surface of wheel cylinder 4a. In addition, as shown in FIG. 2, a locking pin 28 may be used, if need be, thereby preventing wheel cylinder 4 from twisting in bore 3.

In the event that the material used for braking caliper 2a will not permit calking or lancing of braking caliper 2a with wheel cylinder 4a, as shown in FIGS. 4 and 5, it will be possible for wheel cylinder 4, 4a to be sealed, soldered or cemented to the braking caliper in the area of the outlet of bore 3, 3a.

What is claimed is:

1. A braking caliper for a disc brake comprising:
   a brake caliper including a stepped bore having a small diameter portion and a large diameter portion defining an annular shoulder facing one of a pair of brake pad members of said disc brake, a generally pot-shaped rotationally symmetric wheel cylinder having a closed end and an open end including a first outer cylindrical surface portion having a diameter dimensioned to define a press fit with said small diameter portion of said stepped bore, a large diameter portion defining an external annular collar on said wheel cylinder, said wheel cylinder small diameter portion press-fitted into said small diameter portion of said stepped bore with said collar in abutment with said shoulder; and
   a piston slidably, sealingly received in said wheel cylinder.

2. The braking caliper of claim 1, wherein:
   said small diameter portion of said wheel cylinder in the area thereof press fitted into said small diameter portion of said stepped bore includes circumferential raised flat rib means for deforming said caliper and expanding into said caliper in a generally barrel-shaped configuration.

3. The braking caliper of claim 2, wherein said caliper is made of a material having a predetermined elasticity providing for said deformation thereof by said rib means.

4. The braking caliper of claim 3, wherein said caliper material is a spheroidal-graphite cast iron.

5. The braking caliper of claim 1, further comprising:
   flange means extending outwardly from said caliper at an end of said stepped bore around said small diameter portion thereof opposite said shoulder;
   said small diameter cylindrical surface of said wheel cylinder including an annular groove-type depression; and said flange means received in said depression.

6. The braking caliper of claim 5, wherein said flange means includes a plurality of spaced-apart projections.

7. The braking caliper of claim 1, further comprising an arcuate recess at an end of said stepped bore at said large diameter portion thereof, said recess being open radially toward said brake disc.

8. The braking caliper of claim 1, wherein said wheel cylinder includes a radially, inwardly tapered surface portion extending from said small diameter cylindrical surface toward said closed end of said wheel cylinder.

* * * * *